US010565667B2

(12) United States Patent
Brintle

(10) Patent No.: US 10,565,667 B2
(45) Date of Patent: Feb. 18, 2020

(54) METHODS AND SYSTEMS FOR OPTIMIZED AND ACCELERATED REGISTRATION AND REGISTRATION MANAGEMENT

(71) Applicant: Lee P. Brintle, Iowa City, IA (US)

(72) Inventor: Lee P. Brintle, Iowa City, IA (US)

( * ) Notice: Subject to any disclaimer, the term of this patent is extended or adjusted under 35 U.S.C. 154(b) by 555 days.

(21) Appl. No.: 14/830,412

(22) Filed: Aug. 19, 2015

(65) Prior Publication Data

US 2017/0053368 A1 Feb. 23, 2017

(51) Int. Cl.
*G06Q 50/20* (2012.01)
*G06Q 10/10* (2012.01)
*G06Q 10/06* (2012.01)

(52) U.S. Cl.
CPC ......... *G06Q 50/2053* (2013.01); *G06Q 10/10* (2013.01); *G06Q 10/06312* (2013.01)

(58) Field of Classification Search
CPC ........................ G06Q 50/2053; G06Q 10/10
See application file for complete search history.

(56) References Cited

U.S. PATENT DOCUMENTS

| | | | | |
|---|---|---|---|---|
| 6,226,678 B1* | 5/2001 | Mattaway | ......... | H04L 29/06027 709/227 |
| 9,003,019 B1* | 4/2015 | Guo | ......... | G06Q 10/10 370/352 |
| 9,600,340 B1* | 3/2017 | Mundar | ......... | G06F 16/24542 |
| 9,819,626 B1* | 11/2017 | Berg | ......... | H04L 51/18 |
| 9,875,500 B2* | 1/2018 | Garnepudi | ......... | G06Q 30/0637 |
| 10,248,465 B2* | 4/2019 | Tanttu | ......... | G06F 9/5038 |
| 2002/0152305 A1* | 10/2002 | Jackson | ......... | H04L 41/5035 709/224 |

(Continued)

FOREIGN PATENT DOCUMENTS

WO WO-2010127365 A1 * 11/2010 ........... G06F 9/5077

OTHER PUBLICATIONS

Zhu, H. (2000). Caching and service differentiation for scalable network servers (Order No. 3015634). Available from ProQuest Dissertations and Theses Professional. (252079510). Retrieved from http://dialog.proquest.com/professional/docview/252079510?accountid=131444 (Year: 2000).*

(Continued)

*Primary Examiner* — Amanda C Abrahamson
(74) *Attorney, Agent, or Firm* — Alston & Bird LLP

(57) ABSTRACT

Embodiments of the present invention provide methods, systems, apparatuses, and computer program products for optimized and accelerated registration and registration management. In one embodiment, a method is provided for identifying one or more time periods in which a stress level measure for an entity satisfies a configurable threshold. Responsive to identifying the one or more time periods for each account from the plurality of user accounts and during the identified one or more time periods, a determination of whether the respective user account is eligible to register for each of one or more events is made based on restrictions associated with each respective event and based on the information associated with the respective user account. This allows a quicker response to eligibility checks during times when the entity is experiencing a high level of stress.

19 Claims, 11 Drawing Sheets

(56) References Cited

U.S. PATENT DOCUMENTS

| | | | | |
|---|---|---|---|---|
| 2006/0252021 A1* | 11/2006 | Watkins | .................. | G09B 5/00 |
| | | | | 434/350 |
| 2007/0245351 A1* | 10/2007 | Sussman | .................. | G06F 9/50 |
| | | | | 718/104 |
| 2008/0201383 A1* | 8/2008 | Honigfort | ................. | G06F 9/46 |
| 2008/0320242 A1* | 12/2008 | Jelinek | ................. | G06F 9/5077 |
| | | | | 711/153 |
| 2010/0106342 A1* | 4/2010 | Ko | ........................ | G06Q 10/04 |
| | | | | 700/295 |
| 2013/0028085 A1* | 1/2013 | Bilodeau | ............ | H04L 43/0876 |
| | | | | 370/235 |
| 2014/0025967 A1* | 1/2014 | Tran | ..................... | G06F 1/3206 |
| | | | | 713/320 |
| 2014/0195450 A1* | 7/2014 | Van Pelt | ................. | G09B 7/00 |
| | | | | 705/327 |
| 2014/0325524 A1* | 10/2014 | Zangaro | ............... | G06F 9/5083 |
| | | | | 718/105 |
| 2015/0206441 A1* | 7/2015 | Brown | .................... | G09B 5/00 |
| | | | | 434/308 |
| 2016/0065558 A1* | 3/2016 | Suresh | ................... | H04L 63/08 |
| | | | | 726/7 |
| 2016/0140679 A1* | 5/2016 | Segal | ................ | G06Q 50/2053 |
| | | | | 705/327 |
| 2016/0260064 A1* | 9/2016 | Ahmed | ................ | H04L 67/306 |

OTHER PUBLICATIONS

Voelz, L. (May 22, 2013). Leepfrog expands into second facility. Press—Citizen Retrieved from http://dialog.proquest.com/professional/docview/1353556288?accountid=131444 (Year: 2013).*

* cited by examiner

Student Status

| | |
|---|---|
| Full Name: | John Doe |
| Classification: | Sophomore |
| Major: | Micro-biology |
| Minor: | Chemistry |
| Concentration: | N/A |
| Academic Level: | Undergraduate |
| Attribute: | Standard |
| Cohort: | 2013 |
| Program: | Micro-biology |
| College: | Biological Science |
| Department: | Micro-biology |
| Degree: | Bachelors of Science |

Return to Registration | Print | Flag Incorrect information

FIG. 9

METHODS AND SYSTEMS FOR OPTIMIZED AND ACCELERATED REGISTRATION AND REGISTRATION MANAGEMENT

BACKGROUND

Schools and universities have largely moved registration to a self-help environment. Such environment allows students to register for classes without administrator contact or supervision. However, the self-help environment for registration may allow students to register for classes without being eligible to register for the classes. To prevent inappropriate class registrations, multiple checks may be performed by the registration management system.

Typically, the checks are performed at a time when students attempt to register for classes. These checks are performed at a time when the registration management system experiences the highest stress levels. Accordingly, there is a dire market need for methods and systems that can reduce the stress levels of the registration management system and facilitate optimized and accelerated registration and registration management.

BRIEF SUMMARY

This specification relates to optimized and accelerated registration and registration management.

In general, one innovative aspect of the subject matter described herein can be embodied in methods that include the actions of receiving, at a system comprising one or more processors and for a plurality of user accounts, information associated with each user account of the plurality of user accounts; receiving, at the system, information specifying one or more events that one or more user accounts from the plurality of user accounts are eligible to register for, wherein at least one of the plurality of user accounts is not eligible to register for the one or more events; identifying one or more time periods in which a configurable measure for the system meets a pre-specified threshold; responsive to identifying the one or more time periods, for each user account of the plurality of user accounts and during the identified one or more time periods: determining whether the respective user account is eligible to register for each of the one or more events based at least in part on (a) one or more restrictions associated with the event and (b) information associated with the respective user account; responsive to determining whether the respective user account is eligible to register for each of the one or more events, storing eligibility information indicating whether the respective user account is eligible to register for each event from the one or more events; receiving a first request, associated with a first account, for validating registration for an event from the one or more events; and accessing the eligibility information stored in association with the first account, and in response, preventing the first account from registering for the event based on the eligibility information.

Other embodiments of this aspect include corresponding systems, apparatus, and computer programs, configured to perform the actions of the methods, encoded on computer storage devices.

These and other embodiments can each optionally include one or more of the following features. Receiving a second request, associated with a second account, for validating registration for an event from the one or more events; and accessing the information stored in association with the second account and in response approve the second request based on the accessed information.

These and other embodiments can each optionally include one or more of the following features. Identifying, for each identified account, stored information, that require updating, and indicating whether the respective user account is eligible to register for each event from the one or more events; and updating the identified stored information, indicating whether the respective user account is eligible to register for each event from the one or more events.

These and other embodiments may optionally include one or more of the following features. receiving, at the system and for a plurality of user accounts, updated information associated with one or more accounts of the plurality of user accounts; identifying accounts from the plurality of user accounts that require updating, and for each identified account identifying attributes associated with the account that require updating; and updating each identified attribute for each identified account.

Particular embodiments of the subject matter described herein can be implemented so as to realize one or more of the following advantages. Enhancing the user experience by allowing faster registration and providing interactive user interface elements that facilitate registration according to customizable rules. Reduce the stress level of the registration management system. Reducing the stress level, in turn, reduces the heat production, power consumption and operational cost of the registration management system.

The details of one or more embodiments of the subject matter described herein are set forth in the accompanying drawings and the description below. Other features, aspects, and advantages of the subject matter will become apparent from the description, the drawings, and the claims.

BRIEF DESCRIPTION OF THE DRAWINGS

Figure 1:
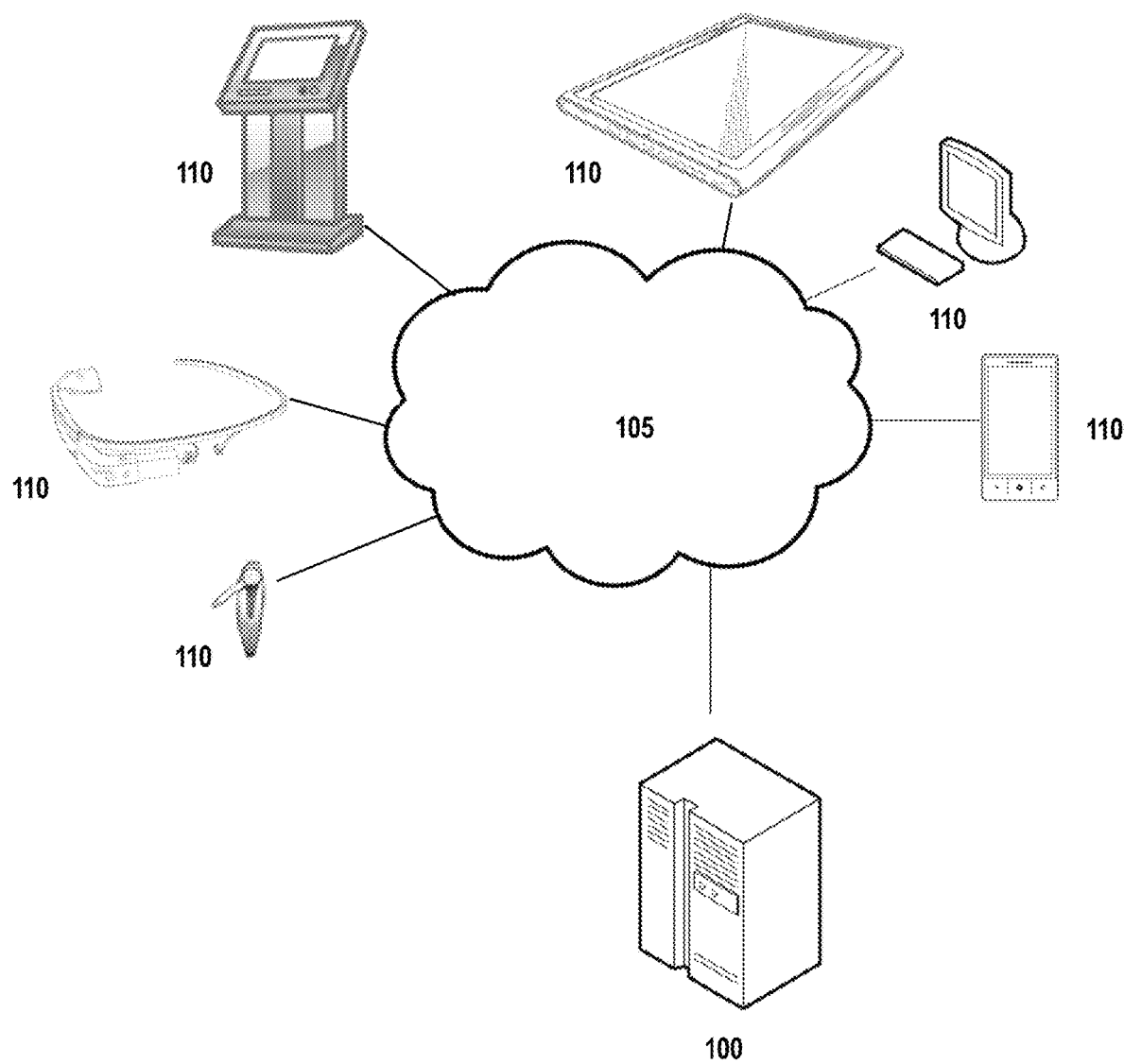
Figure 2:
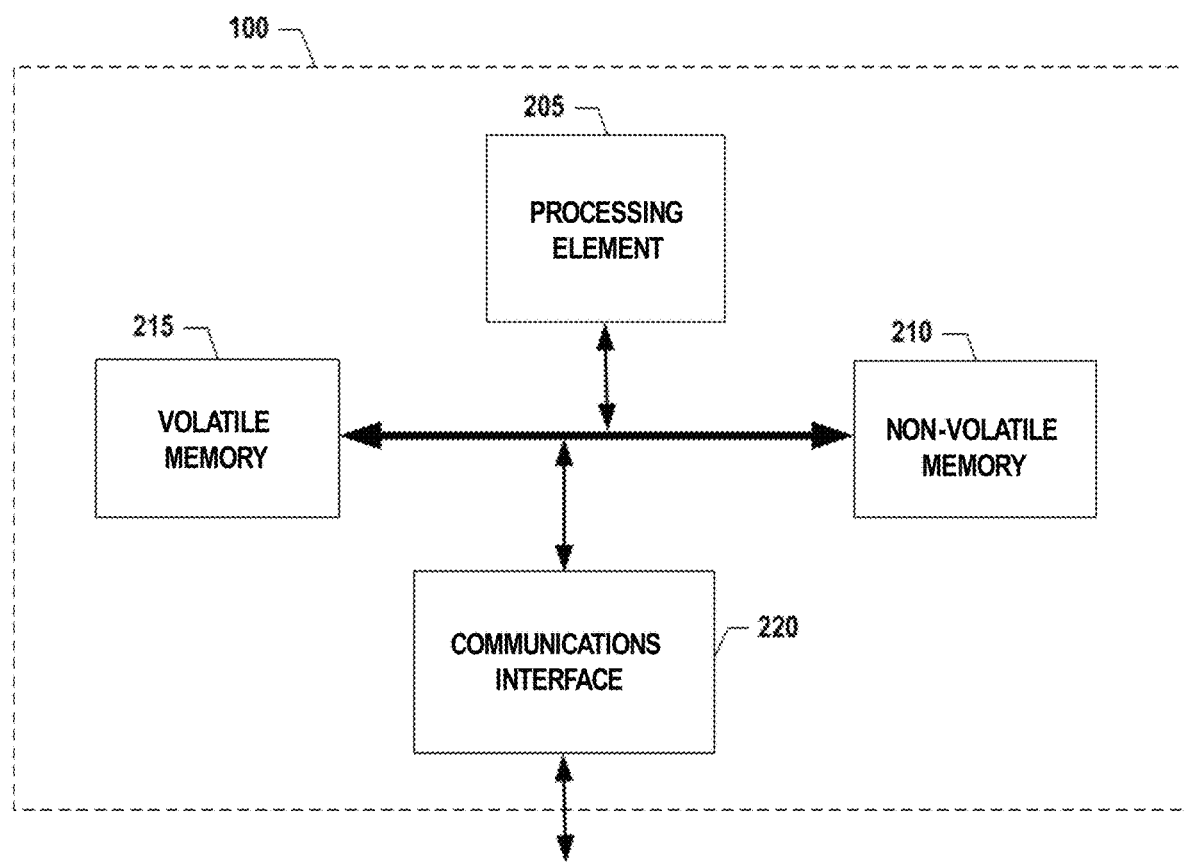
Figure 3:
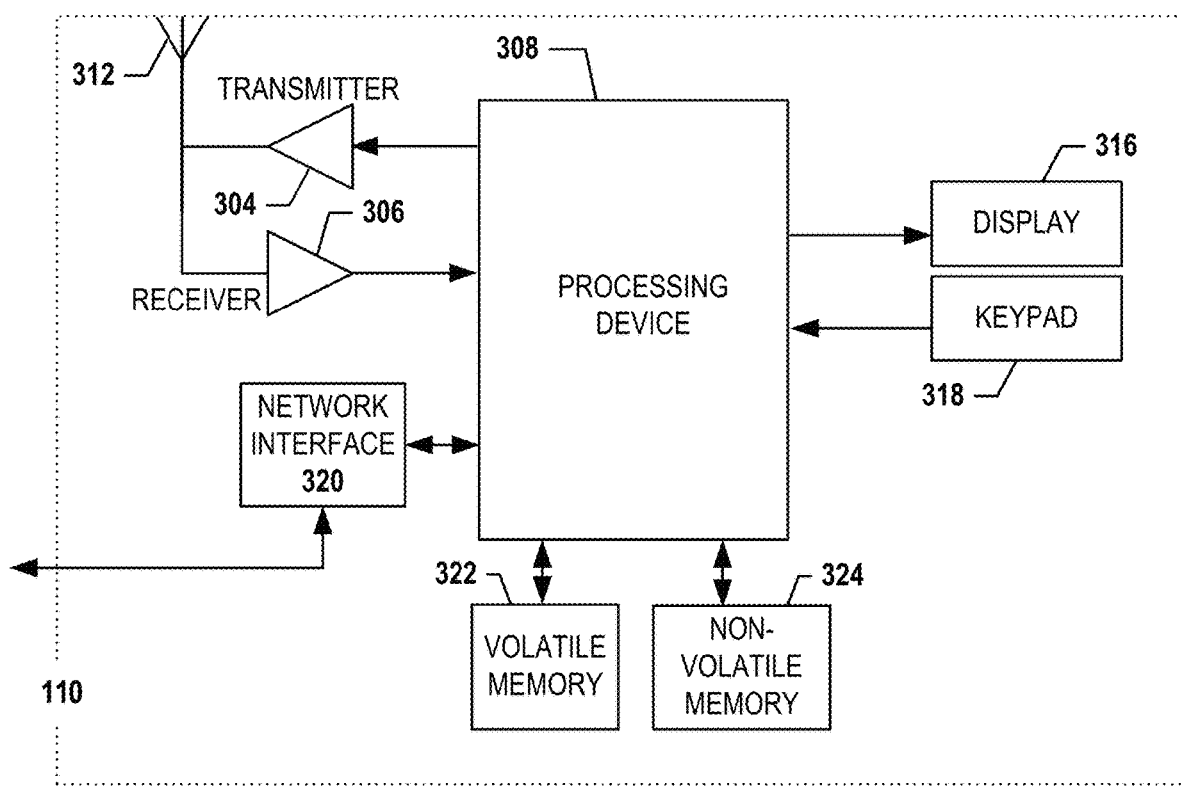
Figure 10A:
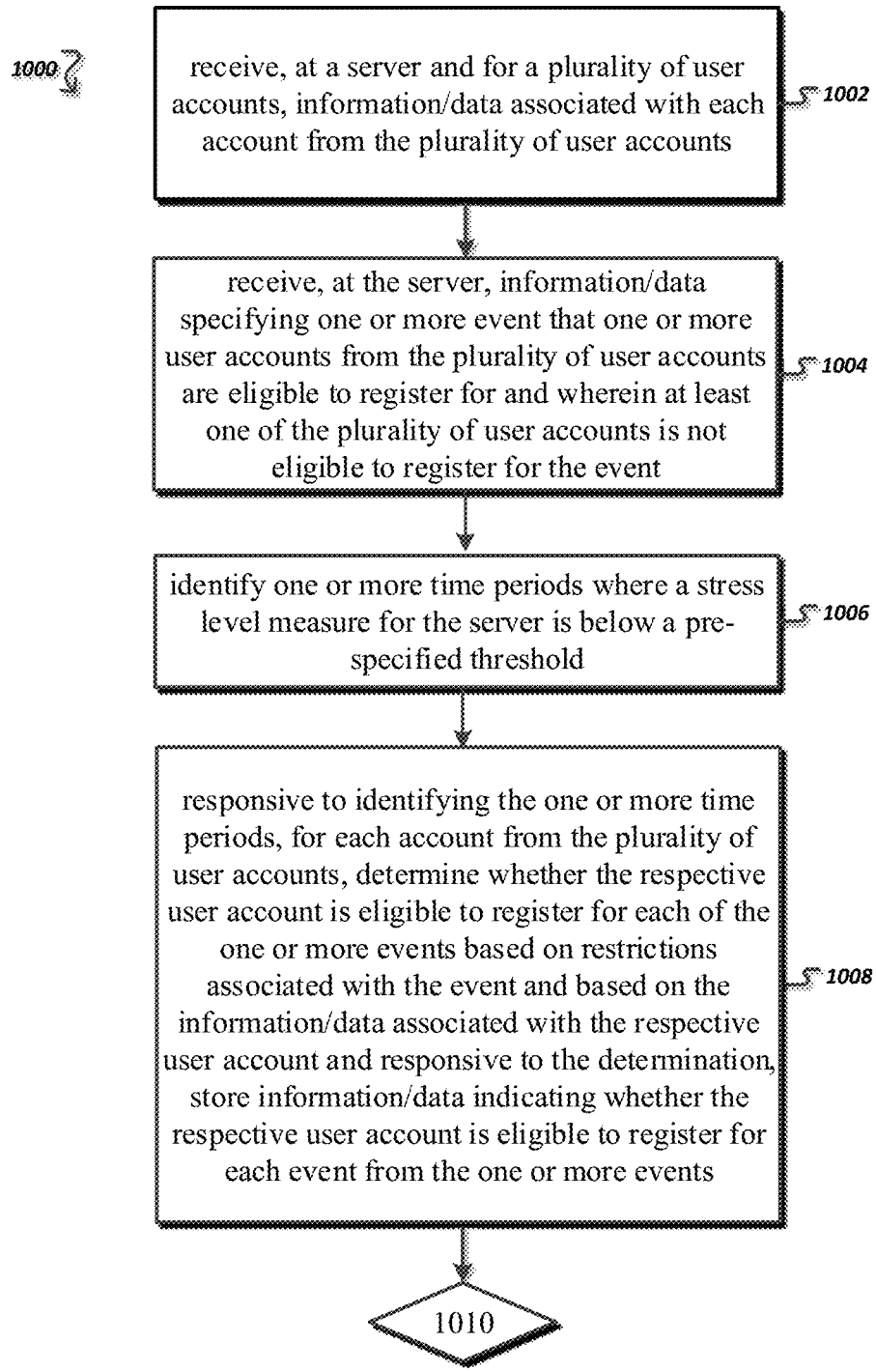
Figure 10B:
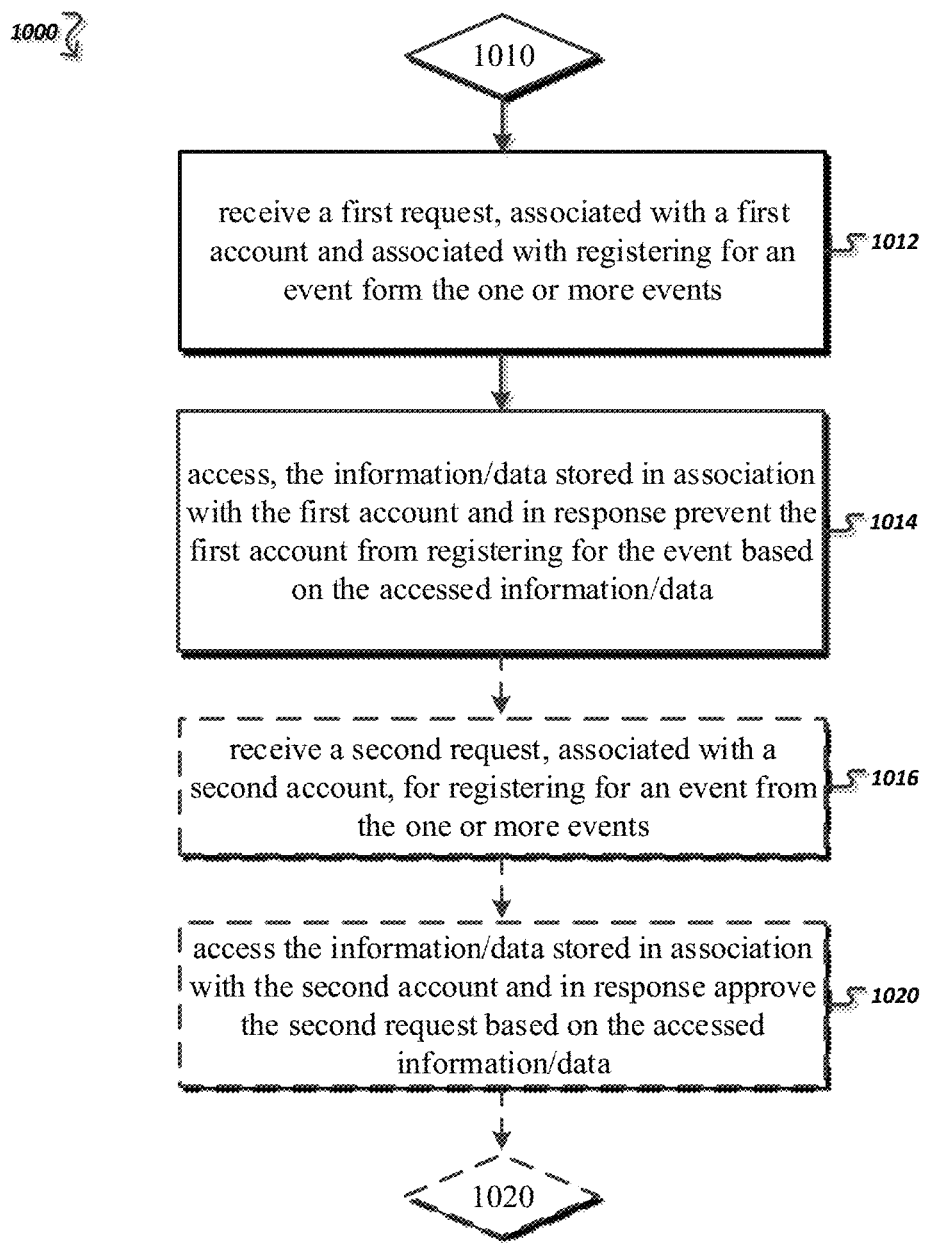
Figure 10C:
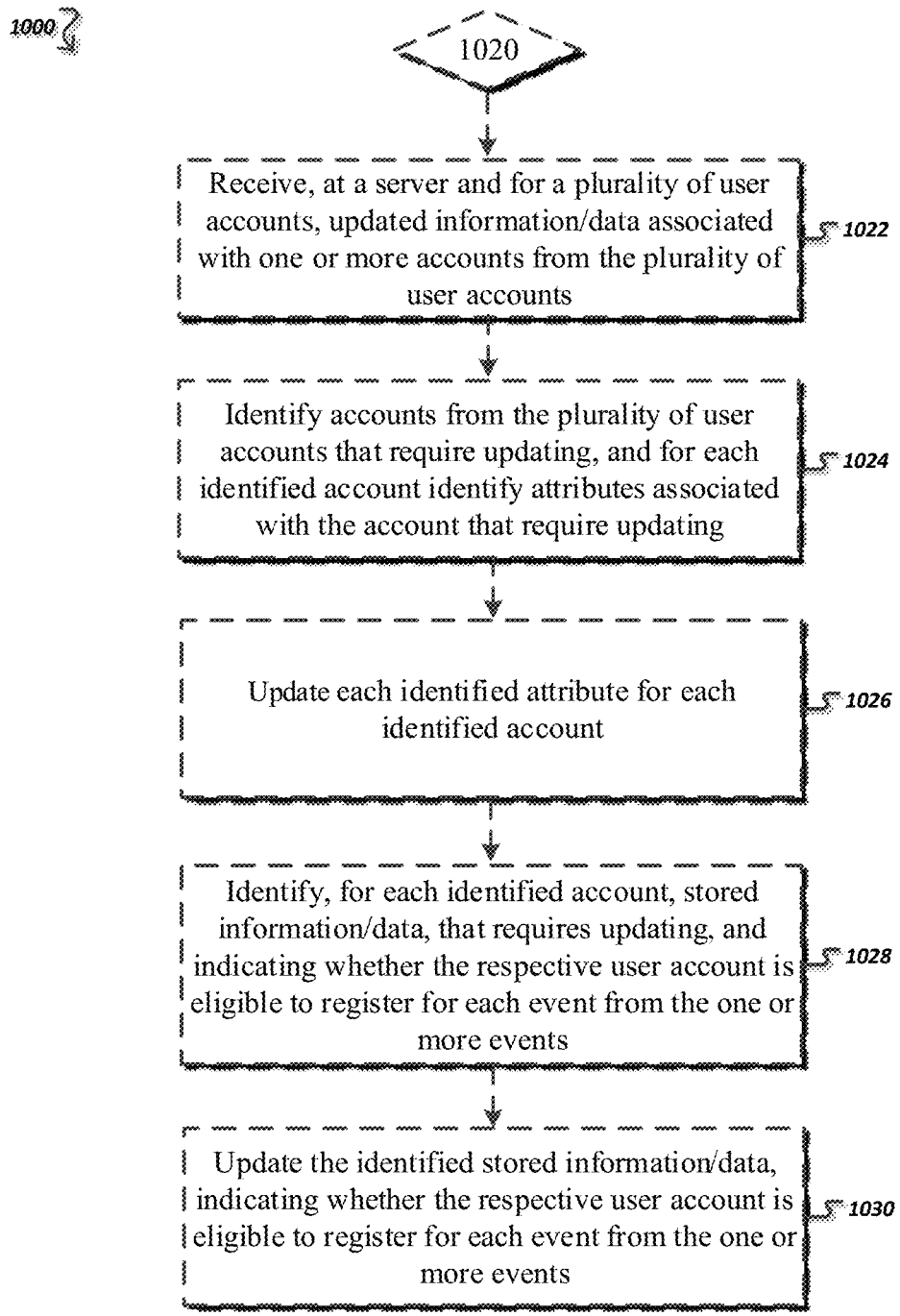

Having thus described the invention in general terms, reference will now be made to the accompanying drawings, which are not necessarily drawn to scale, and wherein:

FIG. 1 is an overview of a system that can be used to practice embodiments of the present invention;

FIG. 2 is an exemplary schematic diagram of a management computing entity according to one embodiment of the present invention;

FIG. 3 is an exemplary schematic diagram of a user computing entity according to one embodiment of the present invention;

FIGS. 4-9 illustrate example views of the interactive user interface, in accordance with various embodiments of the present invention; and FIGS. 10A-10C are flow charts illustrating various procedures and operations that may be completed in accordance with various embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative"

and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more registration management systems 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Registration Management System

FIG. 2 provides a schematic of a registration management system 100 according to one embodiment of the present invention. A registration management system may be a traditional system for managing different types of operations. In one implementation, the registration management system may be for event registrations. For example, the registration management system may be for educational institutes (e.g., universities, schools, research institutes, training institutes). In some implementations, the registration management system may be for management of online resources, rentals, shipping, and/or the like. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, and/or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the registration management system 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the registration management system 100 may communicate with user computing entities 110 and/or a variety of other computing entities.

As shown in FIG. 2, in one embodiment, the registration management system 100 may include or be in communication with one or more processing elements 205 (also referred to as processors, processing circuitry, and/or similar terms used herein interchangeably) that communicate with other elements within the registration management system 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the registration management system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the registration management system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the registration management system 100 with the assistance of the processing element 205 and operating system.

As indicated, in one embodiment, the registration management system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the registration management system 100 may include or be in communication with one or more input elements, such as a keyboard input, a mouse input, a touch screen/display input, motion input, movement input, audio input, pointing device input, joystick input, keypad input, and/or the like. The registration management system 100 may also include or be in communication with one or more output elements (not shown), such as audio output, video output, screen/display output, motion output, movement output, and/or the like.

As will be appreciated, one or more of the registration management system 100 components may be located remotely from other registration management system 100 components, such as in a distributed system. Furthermore, one or more of the components may be combined and additional components performing functions described herein may be included in the registration management system 100. Thus, the registration management system 100 can be adapted to accommodate a variety of needs and circumstances. As will be recognized, these architectures and descriptions are provided for exemplary purposes only and are not limiting to the various embodiments.

2. Exemplary User Computing Entity

A user may be an individual, a family, a company, an organization, an entity, a department within an organization, a representative of an organization and/or person, and/or the like. In one example, users may be registration management system personnel, students, customers, and/or the like. For instance, a user may operate a user computing entity 110 that includes one or more components that are functionally similar to those of the registration management system 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, and/or the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the registration management system 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the registration management system 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the registration management system 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the registration management system 100 and/or various other computing entities.

In another embodiment, the user computing entity 110 may include one or more components or functionality that are the same or similar to those of the registration management system 100, as described in greater detail above. As will be recognized, these architectures and descriptions are provided for exemplary purposes only and are not limiting to the various embodiments.

III. EXEMPLARY SYSTEM OPERATION

As described above, the registration management system 100 and/or user computing entity 110 may be configured for storing information/data associated with students and/or action, providing information/data associated with students and/or action to a user, providing tools for a user accessing or providing information/data associated with a student and/or action, and/or aiding in user access and provisioning of information/data associated with a student and/or action. For example, an action may be registering for and/or dropping a class (also referred to as a course interchangeably herein). As will be recognized, information/data associated with a student may be registration information/data associated with a student, drop information/data associated with a student, schedule information/data for a current semester and/or previous semester, schedule information/data associated with a student for a current semester and/or previous semester, grade information/data, attribute information/data (e.g., honors information/data), class registration and/or registration requirement information/data, classification information/data (e.g., freshman, sophomore, senior), major and/or minor and/or concentration information/data, academic level information/data (e.g., graduate, undergraduate), cohort information/data (e.g., class year), program information/data, college information/data, department information/data, and/or degree information data.

Figure 5:

FIG. 1 shows one exemplary embodiment of the present invention. As will be recognized, a plurality of user computing entities 110 may be able to send information/data to and/or receive information/data from the registration management system 100. For example, a user (e.g., operating a user computing entity 110) may access information/data associated with the user's account by providing authentication information/data associated with the account to the registration management system 100. According to various embodiments, the registration management system 100 and/or user computing entity 110 provides and/or aids in the access and provisioning of information/data in accordance with user instructions and/or input received via the registration management system 100 and/or user computing entity 110 (e.g., via a user interface). The user interface may be accessible from a user computing entity 110 (e.g., in communication with the registration management system 100 via the network 105). For example, in various embodiments, a user may log in to the registration management system 100 from a user computing entity 110 (e.g., by opening a log-in page and entering a user ID and password using display 316 and keypad 318). For example, the user may use a log-in user interface as shown in FIG. 5. The registration management system 100 may be configured to recognize any such log-in request, verify that the user has permission to access the registration management system 100 (e.g., by confirming the user ID and password are valid), and present/provide the user with a user interface (e.g., displayed on display 316). For example, a user account associated with log-in name "John.Doe@university.com" may be associated with the password "password2015." In response to providing the log-in name "John.Doe@university.com" and the password "password2015," using user interface elements 502 and 504 respectively, the user may be granted access to the user's account. In other embodiments, user log-in is not required to access the user interface. Various embodiments of the user interface are discussed in the following sections in more detail.

Figure 4:
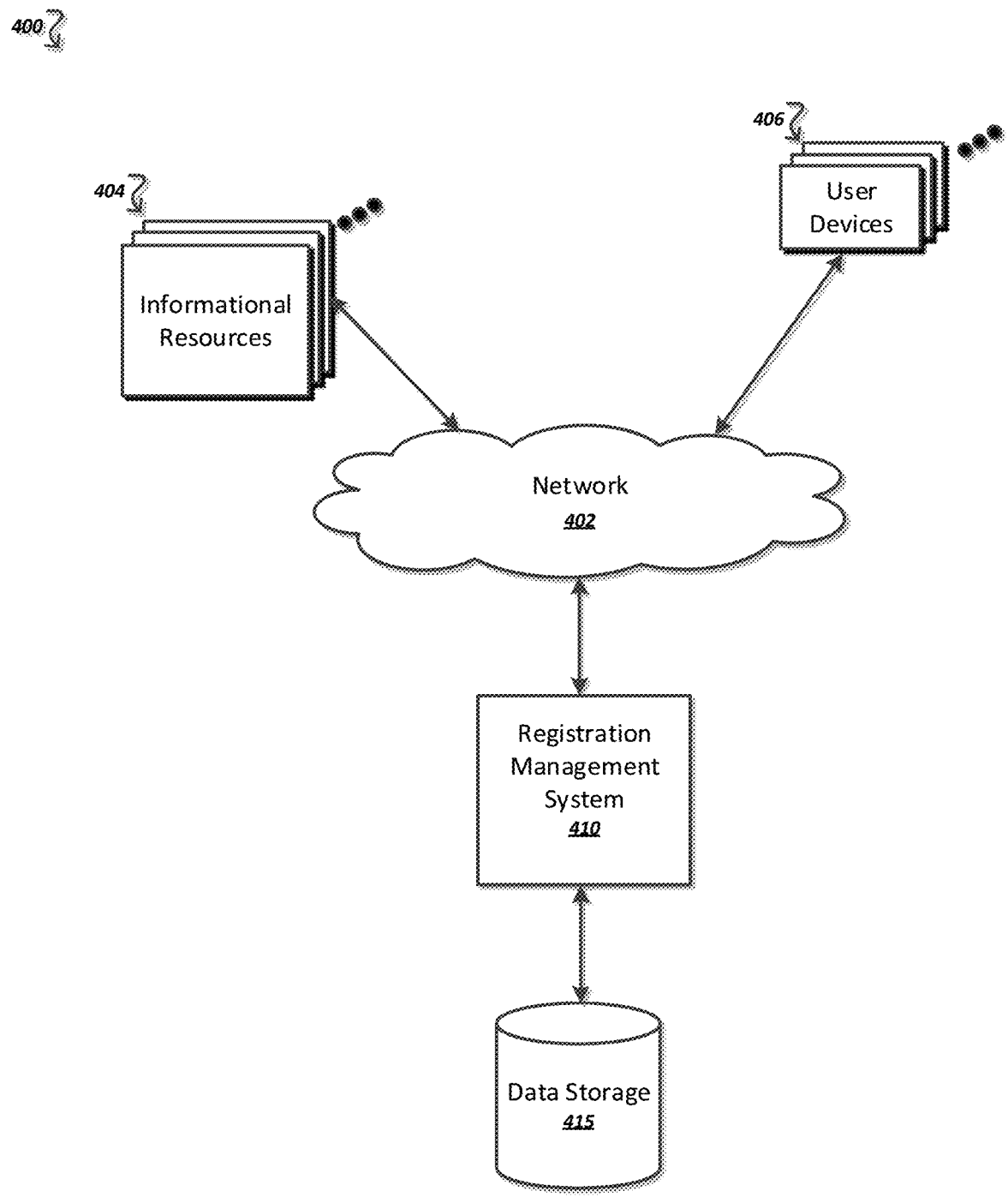
Figure 6:

A user may provide and receive information/data from registration management system 100 using a user interface displayed on user computing entity 110. FIG. 6 illustrates an exemplary user interface element for accessing and providing and/or changing personal information/data. A plurality of personal attributes may be provided, changed and/or accessed by user interface element 600. For example, the personal attribute may include a full name attribute, a mailing address attribute, a social security attribute, a phone number attribute, a primary and an alternative email attribute and/or the like. In some implementations a user may access personal information user interface element 600, in response to providing the log-in information discussed above via user interface element 500. The user then may access his/her personal information/data page. Similarly, the user may change the information/data of one of the personal information/data attributes and interact with user interface element 614 to submit the changes. Alternatively, the user may interact with user interface element 612 to cancel the changes. In some implementations, an administrator may access user interface element 600 by providing the administrator's log-in information/data via user interface element 500. In some implementations, the administrator may select any user account to access the personal information/data associated with the user account. In some implementations, the administrator may change and/or update the personal information/data of a selected account via user interface 600. Similarly, the administrator may be able to create new user accounts by providing personal information/data for association with each respective user account, as shown in FIG. 4. For example, by providing the personal information of a new student and interacting with interface element 414, an administrator can create a new account for a new student. Similarly, an administrator may delete a created user account by interacting with user interface element 412. In some implementations, the administrator may be able to add new personal information/data attributes. For example, the administrator may decide to add a new personal information/data attribute for specifying a state of residency. Similarly, the administrator may be able to remove a personal information/data attribute. For example, the administrator may select to remove the alternative email attribute.

In one embodiment, the user may access a variety of informational resources 104 using user computing entity 110 and/or the user interface in communication with the registration management system 100, including the registration process. To assist in the registration process, the registration management system 100 may perform various eligibility calculations for various user accounts and store the results of the calculations in association with respective accounts in data store 115. In some implementations, data store 115 may be a combination of registration management system 100 internal volatile memory 322 and non-volatile memory 324. In some implementations, data store 115 is an external data store. To maximize system resources, the registration management system 100 may determine one or more periods where the management system 100 is experiencing low stress or when the registration management system 100 is lightly utilized. During such periods, the registration management system 100 may perform various calculations for determining whether a respective user account, from a plurality of user accounts, is eligible to register for each class from a plurality of classes. For example, the registration management system 100 may determine the eligibility of a user associated with a user account to register for each class offered by a university at which the user is enrolled. The process may be repeated for each active user account. The results may then be stored in a data store 115 prior to a registration window in which registration is allowed. During registration, account eligibility information/data is simply fetched from data store 115. An indication of whether an account is eligible to register for a particular class is displayed in association with the class and the account. Since the eligibility information/data is simply fetched from data store 115, the processing required and, in turn, the registration managed system 100 stresses are minimized.

Figure 7:
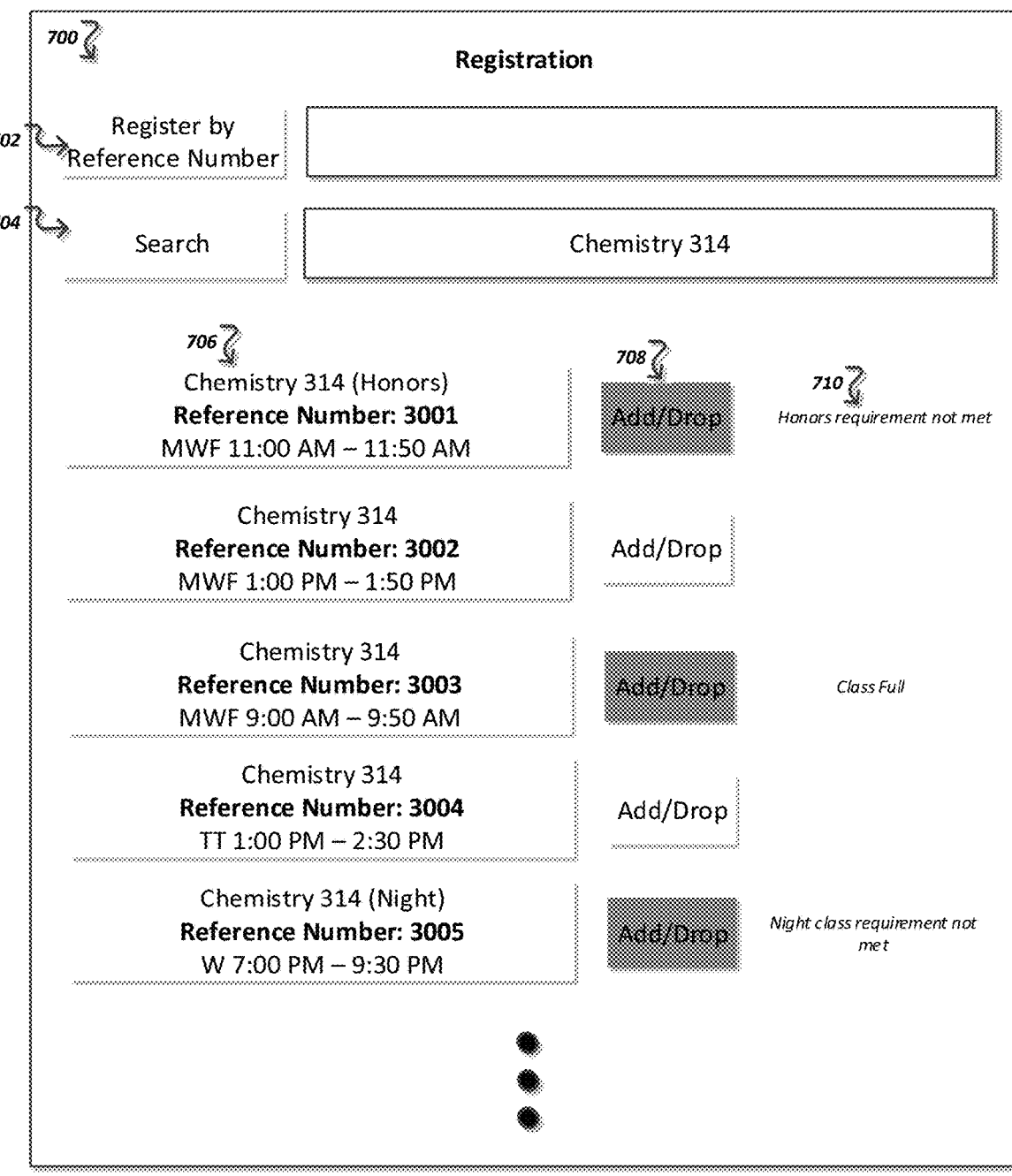
Figure 8:

For example, FIG. 7 depicts an exemplary user interface element 700 for registration, according to various embodiments of the present invention. Responsive to successful log-in via user interface element 500, a user may select to be directed to user interface element 700 for registration. A user may register for a class directly using the class and session unique reference number. The user may provide the unique reference number via user interface element 702. By interacting with user interface element 702, the user may select register for a particular class corresponding to a provided unique reference number. A message may be displayed, indicating that the registration was successful. In some implementations, the message is provided within user interface 700. In some implementations, the message may be provided in a second user interface element (e.g., pop up window). A similar message indicating that the registration for the particular class was not successful may also be displayed. The message may also indicate a reason that resulted in the unsuccessful registration. For example, the message may indicate that the class that the user attempted to register for was already full.

Alternatively, a user may search for a specific class. In some implementations, the user may search for all sessions of a particular class. For example, with reference to FIG. 7, a user may select to search for all sessions of the "chemistry 314" class. The user may provide the description and/or identification numbers associated with a class at user interface element 704. Responsive to interaction with user interface element 704, a list of classes responsive to the search are displayed. Each class and information/data associated with the class may be displayed at user interface element 706. A corresponding user interface interaction element may be displayed at 708. For example, an add/drop radio button may be displayed next to each class and the respective associated information.

The registration management system 100 may access data store 115, in response to receiving the search parameters. Eligibility information/data associated with the account and the classes responsive to the search may be accessed and returned to the registration management system 100. The registration management system 100 may use the accessed and/or returned eligibility information/data to allow or deny registration for each class responsive to the search. When a particular account is not eligible to register for a particular class, the interaction element 708 corresponding to the particular class may be deactivated and/or grayed out. For example, a deactivated interaction element 708 may not perform the add/drop function in response to user interaction. In some implementations, a deactivated interaction element 708 may not perform any action in response to user interaction. For classes that an account is denied eligibility to register for, a reason for the denial may be presented at user interface element 710. For example, the user interface element may state that the "Honors requirement" for the class is not met. In such situation, the account is not identified as an account for an Honor student. Therefore, registration for the Honors session of chemistry 314 may be denied. Alternatively, an account may not be able to register for a class because the class is full. In such case, user interface element 710 may state "class full." In some implementations, eligibility for night class registration may require enrollment in a night program. Therefore, accounts that are not identified as enrolled in a night program may be denied eligibility to register for night classes. In such case, user interface element 710 may display "night class requirement not met." User interface element 710 may display other requirements that are not met and that result in denial of eligibility to register for classes.

In some implementations, the registration management system 100 may use periods of light load and/or light stress to create an eligibility information/data cache. The cache may contain an entry for every account corresponding to a student and every class, indicating whether the respective student is eligible for registering for the respective class. In some implementations, if a student is not eligible to register for a class, a list of reasons for lack of eligibility may also be stored in the cache. For example, in a typical 10,000 student institution offering 5,000 classes, the registration management system 100 may pre-calculate all fifty million combinations ahead of time and cache the results in a database table. Fetching information/data associated with a specific student/class combination in a cache may require milliseconds. Filtering a list of classes to display to users based on results in the cached database is similarly fast. As classes change or a student has his/her academic information/data revised, only the portions of the eligibility cache that are impacted need to be recalculated, as will be discussed below in more detail.

In some implementations, a user may access a student schedule user interface element associated with the user's account. FIG. 9 depicts an exemplary user interface element for accessing a student schedule associated with an account. Responsive to successful log-in via user interface element 500, a user may select to be directed to user interface element 800 for accessing and displaying a schedule. The user may view the classes that the user is currently registered for. Similarly, the user may view classes that the user registered for previously (previous semester and/or academic year). In some implementations, the user may be able to access grades associated with classes previously attended. The current student schedule may be shown via user interface element 802. The user may interact with user interface element 804 to view the schedule in a calendar format or the like. The user may interact with user interface element 806 to print the schedule. Finally, the user may interact with user interface element 808 to return to user interface element 700 for registration.

In some implementations, the user may access a student status user interface element for displaying a current student status with respect to various attributes as shown in FIG. 9. In some implementations, the attributes displayed at student status user interface element 900 are attributes associated with class registration restrictions. In some implementations, a classification attribute may specify whether a student is a freshman, sophomore, junior, or senior. A class registration restriction, for a particular class, may specify that only juniors and seniors may register for the class. Accordingly, the John Doe of FIG. 9 having a sophomore classification is not eligible to register for the particular class. In some implementations, the classification attribute is a prediction that specifies an expected level of the user at an upcoming semester. For example, the classification may project that John Doe will be a junior next semester and therefore John Doe may be eligible to register for the particular class.

The student status user interface element 900 may also include a major attribute. The major attribute may represent a degree-seeking student's primary field of study. A major may be a structured plan of study requiring a minimum pre-specified number of hours. For example, John Doe of FIG. 9 is majoring in micro-biology. In some implementations, registration restrictions may be based on the major attribute. Only students pursuing a chemistry major or minor may be eligible to register for exemplary class chemistry 208. Based on the micro-biology major, John Doe is not eligible to register for chemistry 208. However, John Doe is also pursuing a chemistry minor and therefore is eligible to register for chemistry 208 based on the minor attribute. A minor represents an optional, secondary field of study for a degree-seeking student. Traditionally, students may not declare a major and a minor in the same discipline. In some implementations, a minor is a structured plan of study requiring a minimum pre-specified number of hours. In some implementations, the hour requirements for minors is less than the hour requirements for majors. A concentration is a structured plan of study within a major. In some implementations, concentrations are only available for specific majors. According to the concentration attribute of FIG. 9, John Doe is not currently enrolled in a concentration.

The student status user interface element 900 may also include an academic level attribute. The academic level attribute may specify whether the student is enrolled in graduate studies or undergraduate studies. For example, John Doe of FIG. 9 is enrolled in undergraduate studies. In some implementations, registration restrictions may be based on the academic level attribute. Some classes may be offered only to graduate students. For example, only graduate students may be eligible to register for exemplary class chemistry 809. Accordingly, John Doe is not eligible to register for chemistry 909 because of the undergraduate academic level status.

The student status user interface element 900 may also include a customizable attribute. For example, with reference to FIG. 9, the customized attribute may be for an honors status. John Doe is not enrolled in the honors program and therefore his status is standard under the corresponding attribute. In some implementations, registration restrictions may be based on the customizable attribute. For example, honors classes may require an honors status under the customizable attribute for registration eligibility. Accordingly, John Doe having the standard status under the customizable attribute is not eligible to register for honors classes. The customizable attribute may be configured to store and display one or more status for other attributes that affect registration eligibility.

The student status user interface element 900 may also include a cohort attribute. The cohort attribute may specify the class year for the corresponding student. In some implementations, the class year is the first year the corresponding student attended a school, enrolled in a program, major, minor or the like. The cohort attribute for John Doe is 2013. For example, John Doe may have first enrolled in the micro-biology program in 2013. In some implementations, registration restrictions may be based on the cohort attribute. For example, some classes may be in the process of being phased out by a school or a program. However, these classes may be required for certain majors based on an older set of major requirements that is also being phased out. However, students that enrolled in such program under the old rules may still need to register for one or more classes being phased out. Accordingly, the registration requirement for these classes may require a cohort attribute that equals or predates a specific date. For example, registration eligibility for exemplary class biology 512 may be a cohort attribute that is equal to or predates 2014. Accordingly, John Doe is eligible to register for biology 512.

The student status user interface element 900 may also include a program attribute. A program attribute may specify a program of study that a student is enrolled in. In some implementations, a program may be a field of study that does not result in a particular degree. In other implementations, a program may be a field of study that results in a particular degree. In such implementations, the program attribute may overlap with the major attribute, as shown in FIG. 9. The student status user interface element 900 may also include a college attribute. The college attribute may specify one or more colleges at which a student is enrolled. For example, John Doe is enrolled in the College of Biological Science. In some implementations, particular programs and majors may be listed under two or more colleges. For example, bioengineering majors and programs may be a collaboration between the School of Engineering and the College of Biological Science. A department attribute may specify a department at which a student is enrolled. For example, John Doe is enrolled in the department of Biology. Finally, the degree attribute specifies a degree that a student is pursuing. For example, John Doe is pursuing a Bachelor of Science degree. Similarly, eligibility and restrictions for classes may also be based on the attributes discussed above. For example, eligibility to register for a particular class may be based on the program attribute, the college attribute, the department attribute, and/or the degree attribute.

In some implementations, the registration management system 100 may utilize one or more filters or filter attributes to reduce the amount of calculations required. For example, the registration management system 100 may maintain a "calculation not required" attribute. For example, the registration management system may recognize accounts associated with students that never took a previous class. The registration management system 100 can determine without calculations that such students are not eligible to take any class that requires a class pre-requisite. For example, Calculus II may require Calculus I as a class pre-requisite. The registration system 100 may automatically recognize a student and flag new students or students that never successfully completed a class under the "calculation not required" attribute. Accordingly, the registration management system 100 may automatically store information in association with accounts of such students, indicating that the accounts are not eligible to register for any class that requires a class pre-requisite. In turn, this can drastically reduce the amount of calculations that the registration management system 100 is required to perform.

FIGS. 10A-10C are flow charts illustrating various procedures and operations that may be completed in accordance with various embodiments of the present invention. FIG. 10A is an exemplary flow chart for process 1000. The process 1000 begins with receiving, at the registration management system 100 and for a plurality of user accounts, information/data associated with each account from the plurality of user accounts (1002). For example, the process 1000 may begin with receiving user account creation information/data for one or more accounts. The user account creation data may specify data associated with a new student account. Such data, for example, may comprise personal information/data similar to the personal information/data of FIG. 6. For example, the personal information/data may include name information/data, mailing address information/data, social security number information/data, phone number information/data, e-mail information/data, and/or the like.

The process 1000 continues with receiving, at the registration management system 100, information/data specifying one or more event that one or more user accounts from the plurality of user accounts are eligible to register for and wherein at least one of the plurality of user accounts is not eligible to register for the event (1004). For example, the process 1000 may receive eligibility information/data identifying restrictions and requirements for a particular session of chemistry 314, such that one or more accounts are eligible to register for the particular session of chemistry 314 and one or more accounts are not eligible to register for the particular session of chemistry 314. The restrictions and requirements may be associated with the exemplary attributes described above with reference to FIG. 6.

The process 1000 continues with identifying one or more time periods where a stress level measure for the registration management system 100 is below a pre-specified threshold (1006). For example, the identified periods may be for minutes, hours, days, or even weeks. In some implementations, the process 1000 identifies one or more time periods in which a configurable measure for the registration management system 100 meets a pre-specified threshold. For example, the configurable measure for the registration management system 100 may be a stress measure specifying a level of utilization for the resources of the registration management system 100. In some implementations, the utilization may be specify the utilization of resources of the registration management system 100 in a percentage format. For example, a high stress period for the registration management system 100 may correspond to 92% utilization of the registration management system 100 resources. Similarly, a low stress period for the registration management system 100 may correspond to 30% utilization. In some implementations, meeting a pre-specified threshold may be being equal or exceeding a pre-specified percentage of utilization. In other implementations, meeting a pre-specified threshold may be being equal or less than a pre-specified percentage of utilization. For example, a 40% utilization threshold or lower may be required for identifying the one or more time periods. Accordingly, a period having a 35% utilization threshold would be identified as meeting this configurable measure for the registration management system 100. Typically, when registration windows are open, the registration management system 100 experiences the highest stress levels. Similarly, at periods when registration is closed, the registration management system 100 may experience lower stress levels. In some implementations, the registration management system 100 is responsible for operations other than registration. For example, the registration management system 100 may be responsible for management of financial aid, tuitions, grades, and/or the like. In some implementations, multiple processors and/or servers belonging to the registration management system 100 may perform operations similar to the operations discussed above simultaneously. In some implementations, the threshold discussed above may be applicable only to a specific server or group of servers belonging to the registration management system 100.

The process 1000 may, responsive to identifying the one or more time periods for each account from the plurality of user accounts, determine whether the respective user account is eligible to register for each of the one or more events based on restrictions associated with the event and based on the information/data associated with the respective user account and responsive to the determination store information/data indicating whether the respective user account is eligible to register for each event from the one or more events. For example, with reference to the particular session of chemistry 314 example above, the process 1000 may determine or identify user accounts that are eligible to register for the particular session of chemistry 314. Similarly, accounts that are not eligible to register for the particular session are also determined and/or identified. In some implementations, data is stored in association with each account indicating the eligibility of the account to register for the particular session of chemistry 314. Similarly, additional data may be stored in association with each account indicating the eligibility of the account to register for other sessions of chemistry 314, and/or other sessions of other classes. In some implementations, the eligibility information/data is determined for some or all sessions of all classes offered, and in turn stored in association with each respective account.

The process 1000 may then continue with receiving a first request, associated with a first account, for registering for an event from the one or more events (1012). For example, the process 1000 may receive a request associated with a particular account, and associated with registering for the particular session of chemistry 314. In some embodiments the first request may be for validating registration for the particular session of chemistry 314. In turn, the process 1000 accesses the information/data stored in association with the first account and in response prevent the account from registering for the event based on the accessed information/data (1014). Note that the calculations are minimized at the time of processing the request. The eligibility data is merely fetched to determine the eligibility of an account to register for a particular class.

In some implementations, the process 1000 may continue with the optional steps shown in phantom in FIGS. 10B and 10C. The process 1000 may continue with receiving a second request, associated with a second account, for validating registration for an event from the one or more events (1016). For example, the request may be a request for validating registration for an honors session of chemistry 314. Only honors students may be eligible to register for honors sessions of classes. The process 1000 may then continue with accessing the information/data stored in association with the second account and in response approve the second request based on the accessed information/data. For example, the process 1000 may access information/data associated with the second account. In some implementations, that information/data may specify that the second account is eligible to register for the honors session of chemistry 314. In turn, the process 1000 may allow the second user account to register for the class, as described above with reference to FIG. 6. For example, the process 1000 may approve the registration request for the honors session of chemistry 314 based on the accessed information/data associated with the second account. In some implementations, the process 1000 may simply return a message to the user indicating that user is eligible to register for the honors session of chemistry 314.

In some implementations, the process 1000 may continue with the optional steps shown in phantom in FIG. 10C. In some implementations, the process 1000 may continue with receiving, the registration management system 100 and for a plurality of user accounts, updated information/data associated with one or more accounts from the plurality of user accounts (1022). For example, the information/data may specify that one or more of the student status attributes changed. For example, John Doe of FIG. 9 may have become a junior. Accordingly, the updated information/data may specify that the classification changed and is currently "junior." The data may specify that other attributes changed as well. In some implementations, the updated information/data is received for a plurality of accounts.

The process 1000 may then continue with identifying accounts from the plurality of user accounts that require updating, and for each identified account identifying attributes associated with the account that require updating (1024). In some implementations, the process 1000 may identify that a first account requires the classification and minor attributes to be updated. For example, a student associated with the first account may have changed his/her minor and became a junior. Similarly, the process 1000 may identify that a second account requires that the academic level and attributes be updated. For example, the student associated with the second account may have enrolled in graduate school and exited the honors program. Finally, the process 1000 may identify that a third account does not require that any attributes be updated. In turn, the process 1000 may continue with updating each identified attribute for each identified account (1026).

Similarly, the process 1000 may continue with identifying, for each identified account, stored information/data that requires updating, and indicating whether the respective user account is eligible to register for each event from the one or more events (1028). For example, the process 1000 may continue with identifying, for each identified account, eligibility information/data that requires updating. For example, with reference to the example above of the student associated with the first account that changed his minor and became a junior, the changes to the student status may affect his eligibility to register for one or more classes. These classes are identified and the eligibility information/data associated with these classes and the first account are, in turn, updated. Finally, the process 1000 ends with updating the identified stored information/data, indicating whether the respective user account is eligible to register for each event from the one or more events (1030), as described.

Generating the eligibility information/data cache for association with user accounts and classes may require a great deal of time and resources. However, the information/data used for determining an account's eligibility to register for one class may be reused for other classes. For example, once the registration management system 100 determines for a particular student whether a "freshman" restriction that only allows freshmen to register for a class, similar checks no longer needs to be performed for additional class with the same freshman restriction for the same account. In practice, many classes from the same institution share the same family of restrictions, resulting in significant performance speed-up. In one embodiment, at one major research institution, the 5,000 classes offered by the institute only had 355 unique combinations of restrictions, which, in turn, reduced the work required by 92%. Recuing the work required, in turn, reduce the stress levels of the registration management system 100.

In some implementations, as classes evolve over time, the registration management system 100 may detect if changes are new to the entire system. If a new eligibility rule has been used by another class in the past, the registration management system 100 is able to quickly re-use the earlier calculation for the new class. For example, adding a restriction of "mechanical engineering students only" to a class can quickly re-use the eligibility calculations for another class that was restricted to mechanical engineering students only. If the restriction has never been seen before, such as a new major previously not offered, then the registration management system 100 automatically identifies this new eligibility rules and flags them for calculation at the earliest opportunity.

In some implementations, as a student evolves over time, the registration management system 100 tracks changes to the student record. Once a change is detected, the registration management system 100 only recalculates the portion of the record that is relevant to the change. For example, once the student registers for Calculus I, it changes the list of classes that the student is allowed to register for in future terms.

For example, registering for Calculus for a current semester may permit registration for Calculus II in the subsequent semester. The registration management system 100 may detect that only the eligibility information/data calculations that needs to be re-performed are the eligibility information/data associated with pre-requisite and repeatability calculations, while the major, level, and classification, for example, are unchanged. In some implementations, out of all of the prerequisite calculations, only calculations that are associated with Calculus I or equivalents need to be recalculated. With reference to the exemplary institution above and the Calculus I example, only two classes require their eligibility information/data recalculated in order to completely rebuild an exhaustive eligibility cache. In some implementations, this reduces the stress of the registration management system 100 even further. All other classes having Calculus I as a pre-requisites can have their eligibility determined by the results of the two classes that were explicitly calculated. In some implementations, this recalculation may be performed in real-time as students register for classes, allowing their records to be kept continually up-to-date.

In one implementation, once the student moves from a classification of freshman to a classification of sophomore, only a portion of the eligibility cache needs to be recalculated. Eligibility information/data that does not reference neither the freshman nor the sophomore classification are unaffected and would not change. Changing majors requires the recalculation of only those classes with a restriction based on either a prior major or a new major. In some implementations, all of the other major-based restrictions may be reused from the prior calculation.

Calculation of the eligibility cache may be extremely processing element intensive. However, the eligibility calculations may be performed in parallel to capitalize on the advantages of parallel processing. For example, a first processor at the registration management system 100 may be calculating eligibility information/data for a first group of students, while a second processor at the registration management system 100 is calculating eligibility information/data for a second group of students independently. In some implementations, the registration management system 100 may operate in an explicit mode or an implicit mode.

In some implementations, during explicit calculations, a system administrator may indicate a number of available processors to use and the registration management system 100 runs at a highest utilization of those processors until the calculations are complete, dividing the calculation load and stress among the available resources. Such parallel processing may be appropriate for a complete eligibility information/data cache rebuild during evenings prior to open registration, when the servers and/or processors of the registration management system 100 have excess capacity.

In some implementations, the implicit calculation may run as a background task and may periodically check a queue to determine whether there are pending calculations to be performed. In response to determining that there are pending calculations and the servers and/or processors of the registration management system 100 are experiencing a stress level below a particular threshold, the background task updates a single task before releasing control back to other tasks. In some implementations, the tasks are divided into small pieces such that a sudden external spike in demand for the registration management system 100 can be accommodated quickly. As a result, a change to a class that requires a calculation of the entire student population will proceed as quickly as possible, given the resources that are available. Additionally, the calculation will not put a load on the registration management system 100 during registration in order to recalculate or update eligibility.

IV. CONCLUSION

Many modifications and other embodiments of the inventions set forth herein will come to mind to one skilled in the art to which these inventions pertain, having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer implemented method comprising:
    receiving, by a system comprising one or more processors, information associated with each user account from a plurality of user accounts;
    receiving, by the system, (a) information indicative of one or more events that a first set of user accounts from the plurality of user accounts are eligible to register for, and (b) information indicative of the one or more events that a second set of user accounts from the plurality of user accounts are not eligible to register for;
    identifying, by the system, one or more time periods in which a configurable measure for a system resource satisfies a pre-specified system resource utilization threshold, wherein the configurable measure for the system resource is selected from the group consisting of a load of available computational resources and a stress of computational resources;
    during the identified one or more time periods in which the configurable measure for the system resource satisfies the pre-specified system resource utilization threshold:
        determining whether each user account from the plurality of user accounts is eligible to register for each of the one or more events based at least in part on (a) one or more restrictions associated with the respective events, and (b) information associated with the respective user accounts from the plurality of user accounts, and
        storing the determinations of whether each user account is eligible to register for each of the one or more events as a predetermined eligibility cache, wherein the predetermined eligibility cache is stored prior to receiving a first request;
    receiving, by the system, the first request associated with a first user account from the plurality of user accounts, for registration; and
    responsive to receiving the first request, by the system, generating a presentation for display via an interactive user interface by at least one of (a) filtering out a first set of events from the one or more events and thereby preventing the first account from registering for the first set of events based at least in part on the predetermined eligibility cache, or (b) providing a second set of events of the one or more events, the presentation comprising a respective visible indication for each event of the second set of events indicative of whether the first account is eligible to register for the corresponding event based at least in part on the predetermined eligibility cache.

2. The method of claim 1, further comprising:
receiving a second request, associated with a second account, for validating registration for an event from the one or more events; and
accessing the information stored in association with the second account and in response approve the second request based on the accessed information.

3. The method of claim 1, wherein the one or more events are a plurality of events.

4. The method of claim 1, wherein the information associated with each account of the plurality of user accounts comprises information specifying whether a user associated with the respective account completed one or more events previously.

5. The method of claim 1, wherein the information associated with each account of the plurality of user accounts comprises a prediction of a classification of a user associated with the respective account, wherein the prediction specifies an expected class level of the user at a time of the event.

6. The method of claim 1, wherein the information associated with each account of the plurality of user accounts comprises information specifying an academic concentration.

7. The method of claim 1, wherein the information associated with each account of the plurality of user accounts comprises information specifying a level for a degree currently pursued by a user associated with the respective account.

8. The method of claim 1, wherein the information associated with each account of the plurality of user accounts comprises information specifying one or more groups to which a user associated with the respective account belongs to.

9. The method of claim 1, wherein the information associated with each account of the plurality of user accounts comprises information specifying a semester which a user associated with the respective account was admitted to a particular program.

10. The method of claim 1, wherein the information associated with each account of the plurality of user accounts comprises information specifying a program that a user associated with the respective account is admitted to.

11. The method of claim 1, wherein the information associated with each account of the plurality of user accounts comprises information specifying a college and a department that a user associated with the respective account is currently enrolled in.

12. The method of claim 1, wherein the determining and the storing are performed prior to opening of a registration window for events, the registration window being a time period wherein the one or more account from the plurality of accounts are permitted to register for events.

13. The method of claim 1, wherein the information associated with each account of the plurality of user accounts comprises information specifying a degree that a user associated with the respective account is currently pursuing.

14. The method of claim 1, further comprising:
receiving, by the system and for a plurality of user accounts, updated information associated with one or more accounts of the plurality of user accounts;
identifying accounts from the plurality of user accounts that require updating, and for each identified account identifying attributes associated with the account that require updating; and
updating each identified attribute for each identified account.

15. The method of claim 14, further comprising:
identifying, for each identified account, stored information, that require updating, and indicating whether the respective user account is eligible to register for each event from the one or more events; and
updating the identified stored information, indicating whether the respective user account is eligible to register for each event from the one or more events.

16. A system, comprising:
a data processing apparatus; and
a computer memory apparatus in data communication with the data processing apparatus and storing instructions executable by the data processing apparatus and that upon such execution cause the data processing apparatus to perform operations comprising:
receiving, by a system comprising one or more processors and for a plurality of user accounts, information associated with each user account from a plurality of user accounts;
receiving, by the system, (a) information indicative of one or more events that a first set of user accounts from the plurality of user accounts are eligible to register for, and (b) information indicative of the one or more events that a second set of user accounts from the plurality of user accounts are not eligible to register for;
identifying one or more time periods in which a configurable measure for a system resource satisfies a pre-specified system resource utilization threshold, wherein the configurable measure for the system resource is selected from the group consisting of a load of available computational resources and a stress of computational resources;
during the identified one or more time periods in which the configurable measure for the system resource satisfies the pre-specified system resource utilization threshold:
determining whether each user account from the plurality of user accounts is eligible to register for each of the one or more events based at least in part on (a) one or more restrictions associated with the respective events, and (b) information associated with the respective user accounts from the plurality of user accounts, and
storing the determinations of whether each user account is eligible to register for each of the one or more events as a predetermined eligibility cache, wherein the predetermined eligibility cache is stored prior to receiving a first request;
receiving the first request associated with a first user account from the plurality of user accounts, for registration; and
responsive to receiving the first request, generating a presentation for display via an interactive user interface by at least one of (a) filtering out a first set of events from the one or more events and thereby preventing the first account from registering for the first set of events based at least in part on the predetermined eligibility cache, or (b) providing a second set of events of the one or more events, the presentation comprising a respective visible indication for each event of the second set of events indicative of whether the first account is eligible to register for the corresponding event based at least in part on the predetermined eligibility cache.

17. The system of claim 16, wherein the operations further comprise:
- receiving, by the system and for a plurality of user accounts, updated information associated with one or more accounts of the plurality of user accounts;
- identifying accounts from the plurality of user accounts that require updating, and for each identified account identifying attributes associated with the account that require updating; and
- updating each identified attribute for each identified account.

18. The system of claim 17, wherein the operations further comprise:
- identifying, for each identified account, stored information that requires updating, and indicating whether the respective user account is eligible to register for each event from the one or more events; and
- updating the identified stored information, indicating whether the respective user account is eligible to register for each event from the one or more events.

19. A computer program product comprising at least one non-transitory computer-readable storage medium having computer-readable program code portions stored therein, the computer-readable program code portions comprising:
- receiving, by a system comprising one or more processors and for a plurality of user accounts, information associated with each user account from a plurality of user accounts;
- receiving, by the system, (a) information indicative of one or more events that a first set of user accounts from the plurality of user accounts are eligible to register for, and (b) information indicative of the one or more events that a second set of user accounts from the plurality of user accounts are not eligible to register for;
- identifying one or more time periods in which a configurable measure for a system resource satisfies a pre-specified system resource utilization threshold, wherein the configurable measure for the system resource is selected from the group consisting of a load of available computational resources and a stress of computational resources;
- during the identified one or more time periods in which the configurable measure for the system resource satisfies the pre-specified system resource utilization threshold:
- determining whether each user account from the plurality of user accounts is eligible to register for each of the one or more events based at least in part on (a) one or more restrictions associated with the respective events, and (b) information associated with the respective user accounts from the plurality of user accounts, and
- storing the determinations of whether each user account is eligible to register for each of the one or more events as a predetermined eligibility cache, wherein the predetermined eligibility cache is stored prior to receiving a first request;
- receiving the first request associated with a first user account from the plurality of user accounts, for registration; and
- responsive to receiving the first request, generating a presentation for display via an interactive user interface by at least one of (a) filtering out a first set of events from the one or more events and thereby preventing the first account from registering for the first set of events based at least in part on the predetermined eligibility cache, or (b) providing a second set of events of the one or more events, the presentation comprising a respective visible indication for each event of the second set of events indicative of whether the first account is eligible to register for the corresponding event based at least in part on the predetermined eligibility cache.

* * * * *